United States Patent
Ugarov et al.

(10) Patent No.: US 12,529,679 B2
(45) Date of Patent: Jan. 20, 2026

(54) FLOW RECIRCULATION FOR MOBILITY SEPARATION IMPROVEMENT

(71) Applicants: Thermo Finnigan LLC, San Jose, CA (US); Thermo Fisher Scientific (Bremen) GmbH, Bremen (DE)

(72) Inventors: Mikhail V. Ugarov, San Jose, CA (US); Vladimir Gurevich, Cupertino, CA (US); Pablo Nieto Ramos, Campbell, CA (US); Alexander A. Makarov, Bremen (DE)

(73) Assignees: Thermo Finnigan LLC, San Jose, CA (US); Thermo Fisher Scientific (Bremen) GmbH, Bremen (DE)

( * ) Notice: Subject to any disclaimer, the term of this patent is extended or adjusted under 35 U.S.C. 154(b) by 421 days.

(21) Appl. No.: 18/327,698

(22) Filed: Jun. 1, 2023

(65) Prior Publication Data

US 2024/0255466 A1    Aug. 1, 2024

Related U.S. Application Data

(63) Continuation-in-part of application No. 17/744,408, filed on May 13, 2022, now Pat. No. 11,988,635.

(Continued)

(51) Int. Cl.
*H01J 49/04*   (2006.01)
*G01N 27/623*  (2021.01)
(Continued)

(52) U.S. Cl.
CPC ........ *G01N 27/623* (2021.01); *H01J 49/0422* (2013.01); *H01J 49/066* (2013.01); *H01J 49/22* (2013.01); *H01J 49/24* (2013.01)

(58) Field of Classification Search
CPC .. G01N 27/622; G01N 27/624; G01N 27/628; H01J 49/004; H01J 49/025;
(Continued)

(56) References Cited

U.S. PATENT DOCUMENTS 5,162,649 A   11/1992  Burke
5,869,831 A    2/1999  De La Mora et al.
(Continued)

FOREIGN PATENT DOCUMENTS

EP    3745123 A1   12/2020
GB    2531285 A     4/2016
(Continued)

OTHER PUBLICATIONS

European Search Report and Written Opinion received Sep. 19, 2022 in European No. Application EP22172731.6.
(Continued)

*Primary Examiner* — David E Smith
*Assistant Examiner* — Hsien C Tsai
(74) *Attorney, Agent, or Firm* — ALG Intellectual Property, LLC

(57) ABSTRACT

An ion mobility analyser is disclosed having a gas flow directed along the ion travel axis and a set of electrodes to which DC voltages are applied to establish a DC field. The opposing forces of the gas flow and DC field cause ions to be trapped within a separation region in axial regions determined by their ion mobilities. A gas recirculator, having inlet and outlet ends respectively located downstream and upstream of the separation region, supplies at least fifty percent of the gas flow within the separation region, thereby reducing vacuum pumping requirements.

20 Claims, 3 Drawing Sheets

Related U.S. Application Data

(60) Provisional application No. 63/201,823, filed on May 14, 2021.

(51) Int. Cl.
    *H01J 49/06*     (2006.01)
    *H01J 49/22*     (2006.01)
    *H01J 49/24*     (2006.01)

(58) Field of Classification Search
CPC .. H01J 49/0031; H01J 49/0045; H01J 49/062; H01J 49/0468; H01J 49/164
See application file for complete search history.

(56) References Cited

U.S. PATENT DOCUMENTS

| | | |
|---|---|---|
| 5,905,258 A | 5/1999 | Clemmer et al. |
| 6,630,662 B1 | 10/2003 | Loboda |
| 6,642,514 B2 | 11/2003 | Bateman et al. |
| 6,762,404 B2 | 7/2004 | Bateman et al. |
| 6,787,763 B2 | 9/2004 | De La Mora et al. |
| 6,791,078 B2 | 9/2004 | Giles et al. |
| 7,838,826 B1 | 11/2010 | Park |
| 8,080,787 B2 | 12/2011 | Räther et al. |
| 8,426,806 B2 | 4/2013 | Duong et al. |
| 8,766,176 B2 | 7/2014 | Park et al. |
| 9,304,106 B1 | 4/2016 | Park et al. |
| 9,500,624 B2 * | 11/2016 | Prasad ............... G01N 30/7233 |
| 9,607,817 B1 | 3/2017 | Ugarov |
| 9,891,194 B2 | 2/2018 | Mann et al. |
| 2006/0226353 A1 | 10/2006 | Tang et al. |
| 2009/0134322 A1 * | 5/2009 | Thomson ............ G01N 27/624 250/281 |
| 2015/0340221 A1 | 11/2015 | Henry et al. |
| 2017/0350860 A1 | 12/2017 | Räther et al. |
| 2021/0270773 A1 * | 9/2021 | Makarov ............... H01J 49/025 |

FOREIGN PATENT DOCUMENTS

| | | |
|---|---|---|
| WO | 0164320 A1 | 9/2001 |
| WO | 2004109741 A2 | 12/2004 |
| WO | 2019243083 A1 | 12/2019 |

OTHER PUBLICATIONS

Wu, A. et al., "Electrospray ionization high-resolution ion mobility spectrometry-mass spectrometry". Anal. Chem. Dec. 1, 1998;70(23):4929-38. doi: 10.1021/ac980414z.

* cited by examiner

FLOW RECIRCULATION FOR MOBILITY SEPARATION IMPROVEMENT

This application is a Continuation in Part of U.S. application Ser. No. 17/744,408 filed May 13, 2022, which is a which claims priority from U.S. Provisional Application No. 63/201,823 filed May 14, 2021, which are hereby incorporated by reference

FIELD OF THE INVENTION

The present invention relates generally to separation of ions by ion mobility, and more specifically to an apparatus and method for supplying gas flow to the ion separation region of an ion mobility cell.

BACKGROUND OF THE INVENTION

Ion mobility separation utilizes the transport of analyte ions through a gas in the presence of an electric field to temporally or spatially separate the ions according to their mobility cross-sections. The coupling of ion mobility separation to mass spectrometry provides a means to improve the depth of analytical coverage due to fractionation of target ions by mobility cross-section prior to mass analysis, such that different ion species having the same or similar mass-to-charge ratios may be separately identified and quantified. It also enables novel techniques of parallel accumulation with serial/random injection that improve analysis sensitivity, selectivity and throughput.

There are several ion mobility separation (IMS) techniques known in the field. The simplest device comprises a drift tube formed by a series of rings wherein a constant potential difference is maintained between adjacent members such that a constant electric field is produced. A pulse of ions is introduced into the drift tube which contains a buffer gas and ions separate along the longitudinal axis according to their ion mobility. The device could be operable at atmospheric pressure without RF confinement (see, e.g., U.S. Pat. No. 5,162,649) and can offer a resolution of up to 150 (Wu et. A. Anal. Chem. 1988, 70, 4929-4938).

Operation at lower pressures is more suitable for hybrid ion mobility-mass spectrometer instruments (see e.g. U.S. Pat. No. 5,905,258, and PCT publication WO0164320). Ion losses are typically avoided by RF pseudo-potential well arranged to confine ions radially and may be used to transport ions efficiently by acting as an ion guide thereby solving the problem of diffusion losses (see, e.g., U.S. Pat. Nos. 6,642,514, 6,762,404, 6,791,078, and US Pat. App. Pub. 20060226353).

In all IMS, ion velocity is proportional to electric field E:

$$v = E * K \quad (1)$$

wherein K is the ion mobility. K may exhibit some dependence on E. To avoid this, ion mobility separation is usually maintained in the so-called low field regime whereby ions do not receive kinetic energy from the driving field. For this, the ratio of E to the pressure of the background gas P should be maintained at a value less than about 200V/(m*mbar).

In the patents mentioned, ions are separated according to their ion mobility by progressively applying constant or transient DC voltages along the length of an RF ion guide or ion mobility separator comprising a plurality of electrodes. The ion mobility separator may comprise an AC or RF ion guide such as a multipole rod set or a stacked ring set.

Another variant of IMS, differential mobility analyser (DMA) combines cross-flow of gas and ions in electric field as shown in U.S. Pat. Nos. 5,869,831, 6,787,763, 8,426,806, and 9,607,817. All these designs envisage very high gas flows produced by a blower if at atmospheric pressure or by a pump if at a reduced pressure.

For "traveling wave" IMS, the ion guide is segmented in the axial direction so that independent transient DC potentials may be applied to each segment. The transient DC potentials are superimposed on top of an AC or RF voltage (which acts to confine ions radially) and/or any constant DC offset voltage. The transient DC potentials generate a travelling wave which moves along the length of the ion guide in the axial direction and which acts to translate ions along the length of the ion mobility separator. However, in order to achieve a high resolution of mobility separation at relatively low pressures, a relatively long drift tube must be employed in order to keep within the low field limit as described in more detail below.

This length could be drastically reduced by employing counter-flow of gas, as proposed in U.S. Pat. No. 6,630,662 and PCT Publication No. WO2004109741 and further developed in U.S. Pat. Nos. 7,838,826, 8,080,787, 8,766,176, 9,304,106, 9,891,194 and US Patent Application Pub. No. 2017350860.

In mobility separation techniques based on active gas flow the mobility separation is relying on interaction of ions with the moving gas molecules. Therefore, the separation efficiency, or resolution directly depends on gas flow velocity.

Since most of these IMS separations occur at reduced pressure range of approximately 100 mTorr-10 Torr, the flow is normally created either by the gas entering the separation region from the ion source, or is leaked in from the external gas line/tank.

There are natural limitations on the amount of gas that can be entering from the source. Similarly, while one can leak in more gas to increase the gas velocity in the separation region, this approach may quickly lead to unrealistic configurations as all the additional gas needs to be pumped out. Excessive vacuum pump size and power, management of gas dynamics and shock waves, dependence on atmospheric conditions all pose significant obstacles to practical use. In addition, ion throughput in all patents above is limited by space charge effects which originate from the limited cross-section of the IMS, the latter limitation coming from the need to limit gas flow.

SUMMARY

Roughly described, an ion mobility analyzer is provided that avoids or reduces the gas flow limitations present in prior art devices by recirculating a portion of the gas flow directed through the ion mobility separation region. According to an illustrative embodiment, the ion mobility analyzer includes a mobility separation cell having a set of electrodes defining an ion separation region. The mobility separation cell has an inlet end and an outlet end, and a gas flow directed through the ion separation region. At least some of the electrodes receive DC potentials to establish a DC field in the ion separation region. The ion mobility analyzer further includes a gas recirculator having an inlet end opening to a location downstream of the ion separation region and an outlet end opening to a location upstream of the ion separation region (as used herein, the terms "upstream" and "downstream" refer to the overall direction of ion travel). The gas recirculator has a pump for causing gas to flow from its inlet end to its outlet end, such that a first portion of the gas flow through the ion separation region is supplied by the gas recirculator.

Utilization of the gas recirculation arrangement described above provides relatively high gas flows, enabling improved separation efficiency, while avoiding the need for excessive pumping capacity as well as the aforementioned problems associated with supplying the gas flow solely via the source or from an external gas line.

In accordance with a more specific embodiment, at least 50% of the gas flow within the ion separation region is supplied by the gas recirculator.

In a particular implementation of the ion mobility analyzer, the gas flow is directed co-axially with the major direction of ion travel through the ion separation region. The DC field may act to oppose ion motion, such that ions are trapped within the ion separation region in axial locations determined by ion mobility. In another implementation of the ion mobility analyzer, the gas flow is directed transversely with respect to the major direction of ion travel. The separated ions may be introduced into a plurality of laterally spaced apart ion channels, with each ion channel holding a group of ions of like ion mobility.

In certain specific embodiments, the velocity of gas flow within the ion separation region exceeds 5% of the sonic velocity at one or more locations within the mobility separation cell.

Further provided is a method for separating ions according to their ion mobilities. The method includes a step of introducing ions into the inlet end of a mobility separation cell, which has a plurality of electrodes defining an ion separation region. A DC field is generated within the ion separation region by applying a set of DC potentials to at least some of the electrodes, and a gas flow is established within the ion separation region. A first portion of the gas flow is supplied by a gas recirculator, which has an inlet end located downstream of the ion separation region and an outlet end located upstream of the ion separation region.

DETAILED DESCRIPTION OF EMBODIMENTS

The following discussion sets forth particular embodiments of the present invention. It should be recognized that the descriptions of particular embodiments are intended to be illustrative rather than limiting. Those of ordinary skill in the art will recognize that it may be possible to combine features disclosed in connection with distinct embodiments without departing from the scope of the invention.

Figure 1:
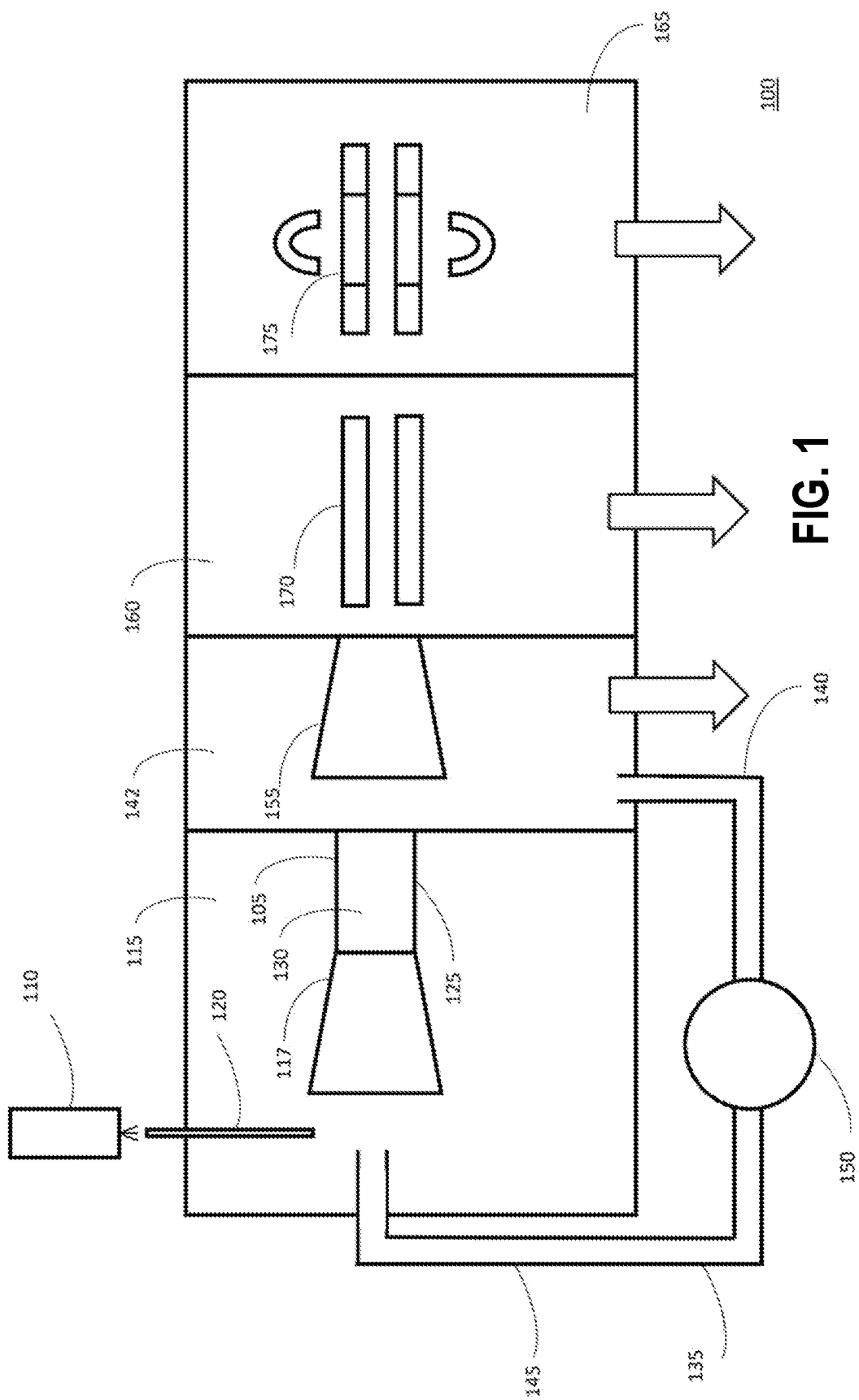
FIG. 1 is a symbolic diagram of a mass spectrometer system incorporating an ion mobility analyzer having a gas recirculator, in accordance with an embodiment of the invention.

FIG. 1 is a symbolic diagram depicting components of a mass spectrometry system 100 incorporating an ion mobility analyzer 105 constructed in accordance with an embodiment of the invention. Ion mobility analyzer 105 effects gas-phase mobility separation of ions generated by ion source 110, which may take the form of an electrospray ionization (ESI) source. Ion source 110 will typically operate at or near atmospheric pressure. The ions produced by ion source 110 may be introduced into a first chamber 115 through an ion transfer tube (capillary) 120, or through an orifice. As depicted in FIG. 1, the ions entering first chamber 115 may be initially directed through an ion funnel 117 or similar device to focus the ions to an axial flow path prior to mobility separation. Ion mobility analyzer 105 is generally comprised of a mobility separation cell 125 defining a separation region 130 and a gas recirculator 135, which supplies a portion of the gas flow directed through gas separation region 130 by recirculating gas drawn from a location downstream of gas separation region 130. Gas recirculator 135 may include an inlet conduit 140 having an inlet opening to second chamber 142, an outlet conduit 145 having an outlet opening to first chamber 115, and a pump 150 for drawing the gas flow from second chamber 142 into first chamber 115 toward separation region 130. In a typical implementation, portions of the inlet and outlet conduits 140 and 145 and pump 150 are located outside of first and second chambers 115 and 142. As will be discussed further in connection with FIGS. 2 and 3, gas recirculator 135 may be provided with a port (not depicted in FIG. 1) communicating with an external gas source, such that a portion of the flow delivered by gas recirculator 135 to separation region 130 may be supplied from the external gas source. In some embodiments, the supplemental gas flow provided by the recirculator 135 would be comparable or exceed the flow of gas coming from the ion source 110 thorough the inlet capillary (e.g., exceed by a factor of 2, 4, 10, 50, or more), so it becomes a significant, or, preferably, the main source of ion mobility separation.

Mobility separation cell 125 may effect the mobility-based separation of ions using any of the variety of structures and operating principles known in the art, some of which are discussed in the introduction above. Generally, mobility separation cell 125 will include a set of electrodes to which DC potentials are applied to establish a DC field within separation region 130. In one illustrative example, mobility separation cell 125 may be configured as a trapped ion mobility separation (TIMS) cell, wherein the forces on the ions produced by the gas flow and the DC field oppose one another, such that ions become trapped within separation region 130 at an axial location determined by their ion mobilities. The trapped ions may subsequently be scanned out of ion mobility separation cell 125 in order of their ion mobilities by progressively varying the gradient of the DC and/or the gas flow directed through separation region 130.

In another implementation of mobility separation cell 125, a transient DC field may be generated by application of appropriate DC potentials to the electrodes to create a set of potential wells that traverse the length of separation region 130, with ions of like mobilities collecting in the same potential well. Such an implementation may be colloquially referred to as a "travelling wave" or "t-wave" device.

In any case, the benefits conferred by the present invention are not to be construed as being limited to a particular implementation of mobility separation cell, but instead may be advantageously utilized with any mobility separation cell in which a gas flow is established.

Mobility-separated ions exiting mobility separation cell 125 pass into second chamber 142, which may contain one or more ion guiding or focusing devices, such as the depicted ion funnel 155. Second chamber 142 is separated from first chamber 115 by a partition (adapted with a small orifice for allowing ions to pass therethrough), and maintained at a significantly lower pressure relative to first chamber 115. Second chamber 142 and third and fourth vacuum chambers 160 and 165 communicate via respective ports with one or more not-depicted vacuum pumps (e.g., a turbomolecular pump) to evacuate the chambers to desired vacuum pressures. Additionally, first chamber 115 may communicate with and be evacuated by a separate pump (e.g., a mechanical scroll pump). Ions leaving second chamber 142 may be subsequently directed through third chamber 160, which may contain ion optics 170 such as a multipole ion guide and into fourth chamber 165. Fourth chamber 165 may contain a mass analyzer 175, which operates to separate the ions according to their mass-to-charge ratios (m/z's) and to generate a mass spectrum. While an ion trap mass analyzer is depicted in FIG. 1, mass analyzer 175 may take the form of any one or combination of mass analyzers, including a quadrupole mass filter, time-of-flight (TOF) analyzer, or orbital electrostatic trap analyzer. In certain implementations of mass spectrometer 100, one or more ion fragmentation devices (e.g., a collision cell) may be placed in the ion path to generate product ions under controlled conditions.

As discussed above, gas recirculator 135 acts to supply a portion of the gas flow through separation region 130, allowing sufficient gas flows to be achieved to provide desired separation resolution without imposing excessive requirements on the mass spectrometer system pumps (i.e., the mechanical and/or turbomolecular pumps). In certain implementations, gas recirculator 135 supplies at least 50% of the gas flow directed through separation region 130, with the remainder of the gas flow being drawn from the flow of gas from the ion source region via ion transfer tube 120, or from an external source. Because the pressure head required to supply the requisite amount of gas flow to separation region 130 is typically less than 0.5-1 mbar, a variety of commercial or purposed designed devices may be utilized for pump 150. These devices may take the form, for example, of a radial turbo compressor or centrifugal blower, which are commercially available from vendors such as Celeroton AG (Volketswil, Switzerland). The total amount of gas flow through separation region 130 will depend on details of the mobility separation cell geometry and the desired resolution; for typical applications, the gas flow will be set such that the gas velocity reaches a substantial fraction of the sonic velocity at at least axial location within separation region 130, such as ≥30%, ≥20%, ≥10% or ≥5% of the sonic velocity.

Figure 2:
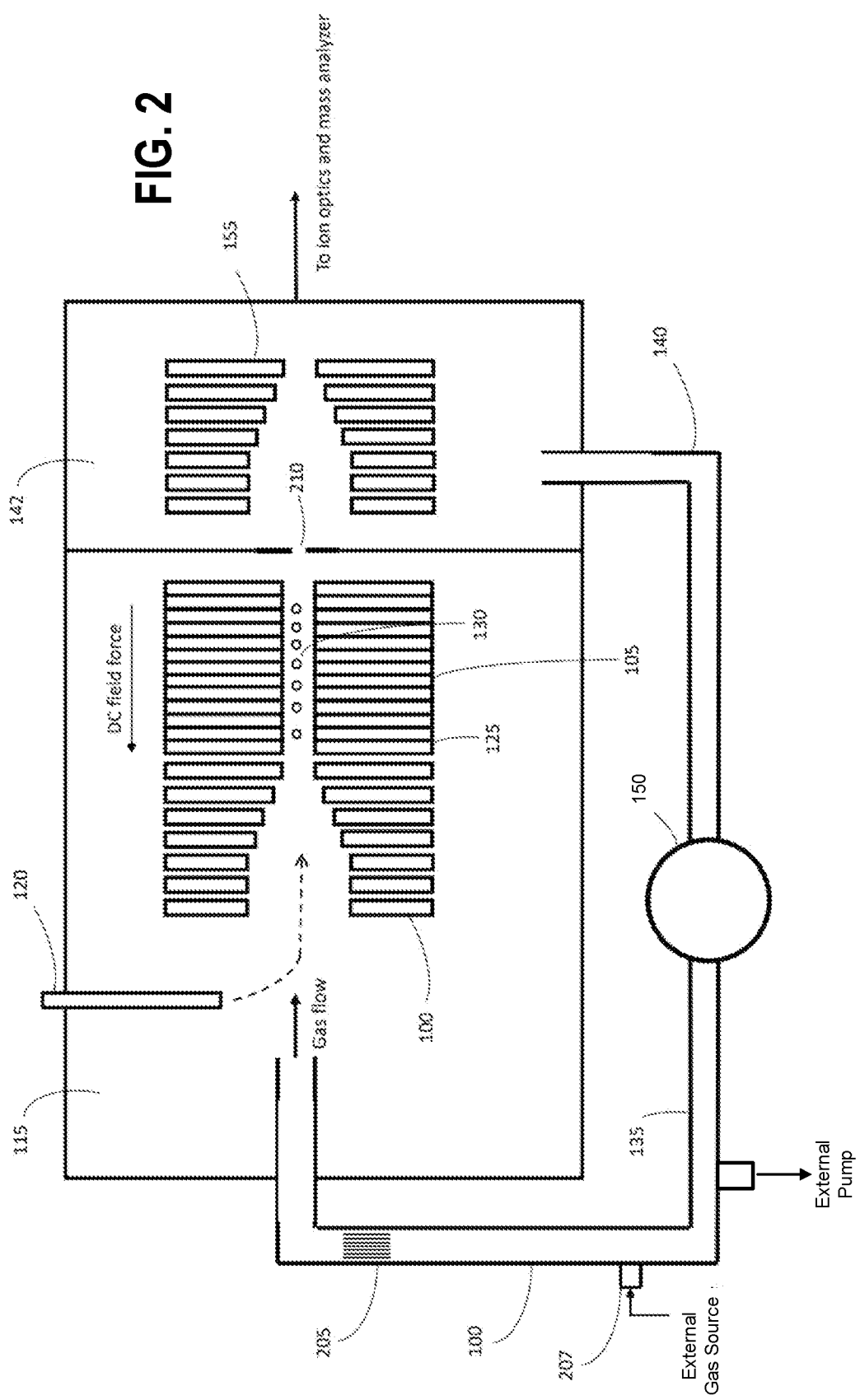
FIG. 2 is a symbolic diagram depicting the components of a first implementation of the ion mobility analyzer, wherein the gas flow is directed co-axially with the major direction of ion travel.

FIG. 2 is a symbolic diagram depicting in greater detail an implementation of ion mobility analyzer 105, generally corresponding to the trapped ion mobility arrangement described above. In this implementation, ions are introduced into first chamber 115 via ion transfer tube 120, which is oriented such that its major longitudinal axis is transverse to the central axes of ion funnel 117 and ion mobility separation cell 125. The ions emitted from ion transfer tube 120 are deflected by being entrained in the gas flow exiting the outlet end of gas recirculator 135 (and possibly also by an electric field established by applying a DC potential to a not-depicted deflector electrode), such that they travel toward the inlet of ion funnel 117. As is known in the art ion funnel 117 may comprise a set of ring electrodes having progressively decreasing (in the direction of ion flow) aperture sizes to which oscillatory (e.g., radio-frequency) and optionally DC voltages are applied in order to establish a field that focusses the ion to the axial centerline as they traverse the ion funnel to its outlet.

The ions then enter separation region 130 defined interiorly of mobility separation cell 125. Mobility separation cell 125 consists of a set of electrodes to which DC potentials are applied to generate an axial DC field. As indicated by the arrow, the DC field is directed such that it imposes a force opposite to the direction of the gas flow. The opposed electric field and gas dynamic forces causes ions to be trapped within separation region 130 at axial locations corresponding to the ions' mobilities, with ions of like mobility being trapped in approximately the same location. As discussed above in connection with FIG. 1, the velocity of the gas flow within separation region 130 may be set at a substantial fraction of the sonic velocity (at least one axial location), such that the desired separation resolution may be attained. In various implementations, the gas velocity may be as ≥30%, ≥20%, ≥10% or ≥5% of the sonic velocity. Mobility separation cell 125 will typically be operated at sub-atmospheric pressure, with usual pressures within first chamber 115 being in the range of 0.1-10 Torr.

As shown, gas recirculator 135 has an inlet end (of its inlet conduit 140) opening to second chamber 142, which is maintained at a reduced pressure (e.g., on the order 50 mTorr-5 TorrmTorr) relative to first chamber 115. Pump 150 is sized and operated to provide the desired gas flow through separation region 130. As indicated above, gas recirculator 135 may provide at least 50% of the gas flow through separation region 130. The gas drawn from second chamber 142 is pumped to the outlet end (of outlet conduit 145) opening to first chamber 115. In the arrangement depicted in FIG. 2, the outlet portion of gas recirculator 135 is oriented such that the direction of gas flow is co-axial with the major (longitudinal) axis of ion travel through ion funnel 117 and mobility cell 135. However, in other embodiments the positions of the inlet end, the position of the outlet end, and/or the direction of the gas flow from the gas recirculator 135 may reversed such that the path of the gas flow has a desired alignment (e.g., a desired direction, orientation, angle, flow field, etc.) with respect to the ion path. For example, the "inlet" of the pump (i.e., the end of the pump that drives gas from the gas recirculator 135 to the interior chambers of the system 100) may be connected to the downstream chamber (142) and the "outlet" of the pump (i.e., the end of the pump that removes gas from the interior chambers of the system 100 and into the gas recirculator 135) connected to the upstream chamber (115) such that the recirculator would be providing a counterflow of gas. In such an embodiment, the mobility separation is generated by a "force" that is pushing ions downstream. The force can be chosen from the set containing DC voltage gradient, traveling wave, or another option known in the art. In this configuration, a special care needs to be taken to assure low loss of ions that need to be transported against the gas flow.

The outlet end of gas recirculator 135 may be shaped and sized such that the cross-sectional velocity profile of gas entering the inlet end of ion funnel 117 is substantially uniform. To facilitate a flat velocity profile across the flow cross-section, a flow diffuser 205 may be disposed within outlet conduit 145, preferably proximate the outlet end. The length of the recirculator circuit should be as short as possible to increase conductance reduce the overall size. The recirculator pump needs to be able to maintain constant operation throughout the life of the instrument and operate at reasonably low temperature so that the temperature of the recirculating gas is not very far from the room temperature, preferably not warmer by more than 30° C. The power consumed by the pump should be reasonable to allow for efficient cooling of the pump as well as the surrounding elements of the recirculator, preferably air-cooling. The pumping capacity of the pump should be sufficient to produce sufficient pressure gradient through the ion separation device. Depending on the length and cross-sectional area of the device, as well as the desired operating pressure, the pressure drop could be in the range of 0.1-2.0 Torr.

In a specific implementation, gas recirculator 135 may be provided with a port 207 through which additional gas is added from an external gas source, and or a port 209 through which gas may be removed from the gas recirculator 135. In this way, in some embodiments the ion mobility analyzer 105 may automatically add or remove gas from the gas recirculator 135 to maintain a desired flow speed and/or pressure level. For example, the ion mobility analyzer 105 may be configured to receive sensor information relating to the gas within the gas recirculator 135, and then may introduce or remove a set amount of gas through ports 207/209 that is determined to maintain the desired flow speed and/or pressure level.

Ions trapped in separation region 130 may be scanned out in order of their ion mobilities by gradually changing the DC field gradient (i.e., by changing the DC potentials applied to the electrodes of ion mobility cell 125, or by varying the rate of gas flow through ion separation region 130). Ions leaving ion mobility cell 125 pass through orifice 210 into second chamber 142, where they are focused by ion funnel 155 for subsequent passage into downstream regions of mass spectrometer 100 and eventual mass analysis.

Figure 3:
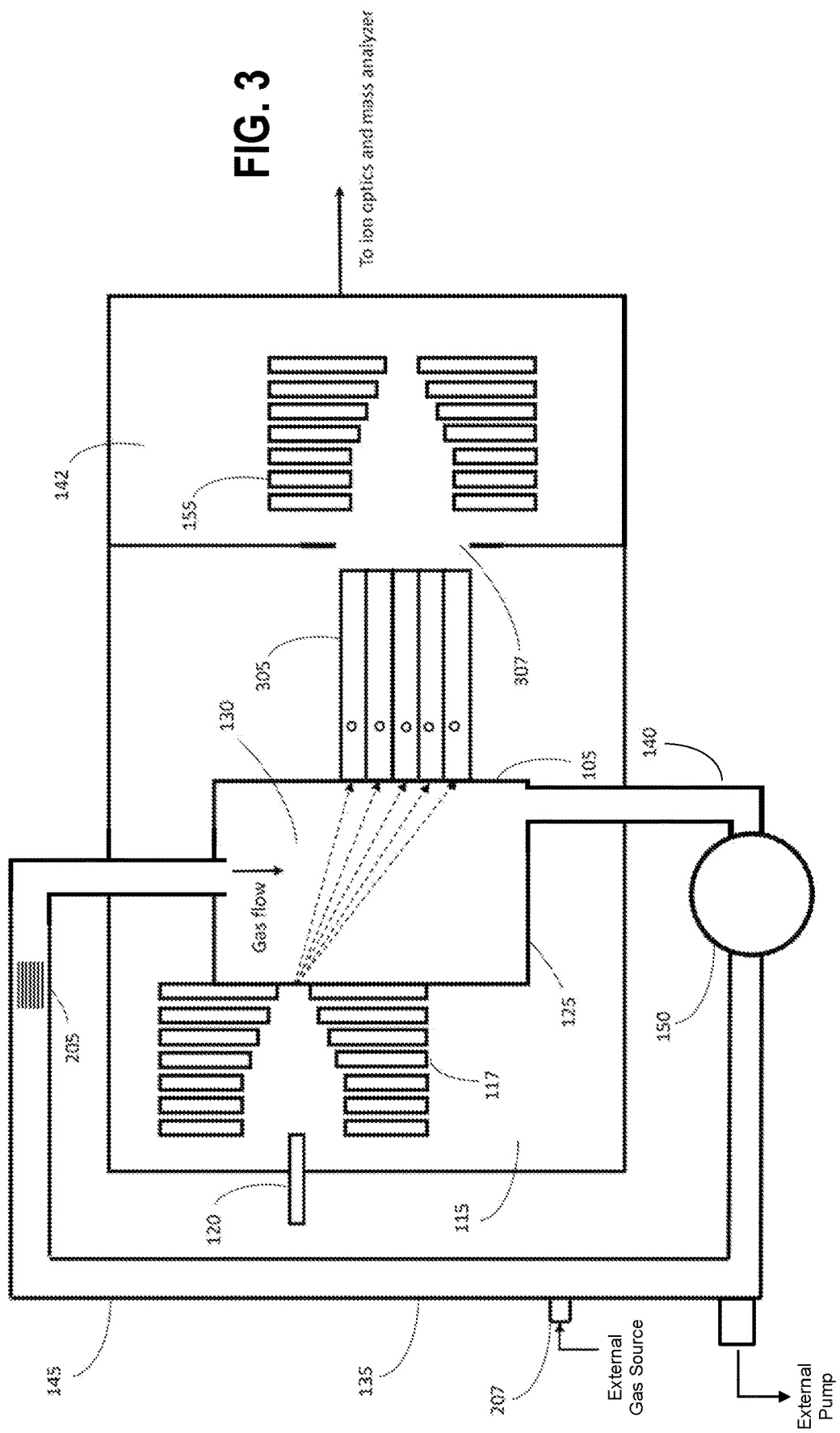
FIG. 3 is a symbolic diagram of an alternative implementation of the ion mobility analyzer, wherein the gas glow is directed transversely to the major direction of ion travel, and the separated ions are introduced into an array of ion channels, with each channel receiving ions of like mobilities.

FIG. 3 depicts an alternative embodiment of ion mobility analyzer 105. In this embodiment, ions are introduced into first chamber 115 through an ion transfer tube 120 that is oriented such that its longitudinal axis is substantially co-axial with the central axis of ion funnel 117. The ions are focused by ion funnel 117 and pass into mobility separation cell 130. Mobility separation cell 130 is equipped with a set of electrodes to which DC potentials are applied to generate a DC field that imposes a force on the ions traversing ion separation region 130. In this embodiment, the outlet end of gas recirculator 135 is oriented such that the axis of gas flow leaving outlet conduit 145 is transverse to the major direction of ion travel through separation region 130 (left-to-right in FIG. 3). Additionally, FIG. 3 illustrates an embodiment where the outlet end of the gas recirculator being positioned at an opposite end of the separation region 130 such that it opposes the inlet end such that the gas flow created by the recirculatory 135 is transverse. For example, in various embodiments the gas flow may be in a first direction and the DC field acts on ions in a second direction and the angle between the first direction and the second direction may correspond to or be greater than 10°, 15°, 20°, 30°, 45°, 75°, 85°, 90°, etc. One skilled in the art would understand that the two ends do not need to be opposing within the scope of the disclosure. The combined action of the electric field and gas dynamic forces affects the trajectories of ions through ion separation region 130, producing separation of ions according to their mobilities in the transverse dimension (the vertical axis of FIG. 3), with ions of like mobilities following the same trajectory. While FIG. 3 illustrates the gas flow flowing downward into the ion separation region 130, in other embodiments the positions of the inlet end, the position of the outlet end, and/or the direction of the gas flow from the gas recirculator 135 may reversed such that the path of the gas flow has a desired alignment (e.g., a desired direction, orientation, angle, flow field, etc.) with respect to the ion path.

The separated ions may be stored in transversely spaced channels arranged within trap 305, which may consist of a plurality of elongated electrodes to which oscillatory and DC voltages are applied; each channel will store of group of ions of like mobilities.

As in the FIG. 2 embodiment, gas recirculator 135 may supply at least 50% of the gas flow within separation region 130. The flow of gas being recirculated into the separation device through the recirculator 135 should be substantially higher (e.g., more than 2×, 5×, 10×, 100×, or greater) than the flow of gas leaving the separation device 130 through the one or more ports into exit channels so that the ion separation occurs in substantially uniform gas flow field. For example, an embodiment of the present disclosure the gas flow recirculated into the separation device by the recirculator 135 may be more that 10× the gas leaving through the exit ports. The size and geometry of the gas recirculator 135 outlet may be selected to provide a substantially uniform gas velocity profile across the separation region. Flow diffuser 205 may be disposed within outlet conduit 145, preferably proximate the outlet end in order to facilitate a flat velocity profile across the flow cross-section. Additional gas flow from an external source may be supplied via port 207.

Mobility-separated ions trapped in the channels of trap 305 may be scanned out on a channel-by-channel basis by application or adjustment of suitable oscillatory and DC potentials to the trap electrodes. Ions leaving trap 305 pass into second chamber 142 through orifice 307, where they are focused by ion funnel 155 for subsequent passage into the lower-pressure regions of mass spectrometer 100 and delivered to the mass analyzer.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. An ion mobility analyser, comprising:
 a mobility separation cell including a set of electrodes defining an ion separation region, wherein the mobility separation cell is configured to be at sub-atmospheric pressure when in operation, and the mobility separation cell having:
  an ion inlet end and an ion outlet end and a gas flow within the ion separation region; and
  at least a portion of the set of electrodes having a set of direct current (DC) potentials applied thereto to generate a DC field in the ion separation region; and
 a gas recirculator including a first end opening to a location downstream of the ion separation region and a second end opening to a location upstream of the ion separation region, the gas recirculator having a pump for causing gas to flow:
  into the gas recirculator through one of the first end opening or the second end opening; and
  out the gas recirculator through the other of the first end opening or the second end opening; and
 wherein the DC field acts on ions in a direction substantially different to the direction of gas flow, such that ions are separated within the ion separation region in axial locations according to ion mobility.

2. The ion mobility analyser of claim 1, wherein the pump causes the gas to flow into the gas recirculator through the first end opening and out of the gas recirculator through the second end opening such that the gas flow within the ion separation region is opposite the direction of the ion path.

3. The ion mobility analyser of claim 1, wherein the DC field acts on ions in a first direction and the gas flow is in a second direction, and there is a greater than 15° difference between the first direction and the second direction.

4. The ion mobility analyser of claim 3, wherein second direction is substantially perpendicular to the first direction.

5. The ion mobility analyser of claim 1, wherein at least fifty percent of the gas flow within the ion separation region is supplied by the gas recirculator.

6. The ion mobility analyser of claim 1, wherein the first end of the recirculator opposes the outlet end of the recirculator.

7. The ion mobility analyser of claim 1, wherein a first gas flow through the gas recirculator is higher than a second gas flow leaving the separation device through one or more exit channels such that ion separation occurs in a substantially uniform gas flow field.

8. The ion mobility analyser of claim 1, wherein the supplemental gas flow provided by the gas recirculator exceeds the flow of gas coming from the ion source thorough the inlet capillary.

9. The ion mobility analyser of claim 1, where the DC field and the gas flow from the gas recirculator cause the ions to be trapped in a plurality of ion traps according to their respective ion mobilities.

10. The ion mobility analyser of claim 1, wherein the velocity of the gas flow exceeds five percent of the sonic velocity at least one location within the mobility separation cell.

11. The ion mobility analyser of claim 1, further comprising a mass analyser located downstream in the ion path from the mobility separation cell for separating ions leaving the mobility separation cell or product ions derived therefrom according to their mass-to-charge ratios.

12. The ion mobility analyser of claim 1, wherein the DC field is static.

13. The ion mobility analyser of claim 1, wherein the DC field is transient.

14. The ion mobility analyser of claim 1, wherein the gas recirculator includes a first port for adding gas from an external source, and a second port for removing gas from the gas recirculator.

15. The ion mobility analyser of claim 14, wherein ion mobility analyser is configured to automatically adjust the gas in the gas recirculator via the first and second ports to maintain a desired flow speed and/or pressure level.

16. A method for separating ions according to their ion mobilities, comprising:
introducing ions to an inlet end of a mobility separation cell operating at sub-atmospheric pressure, the mobility separation cell having a plurality of electrodes defining an ion separation region;
generating a DC field within an ion separation region by applying a set of DC potentials to at least some of the plurality of electrodes, wherein the DC field acts on ions in a direction substantially different to the direction of gas flow; and
establishing a gas flow within the ion separation region, such that ions are separated within the ion separation region in axial locations determined by ion mobility, wherein the has flow is at least partially supplied by a gas recirculator having a first end located downstream of the ion separation region and a second end located upstream of the ion separation region.

17. The method of claim 16, wherein the gas flow is established by the gas recirculator through the first end opening and out of the gas recirculator through the second end opening such that the gas flow within the ion separation region is opposite or transverse with the direction of the ion path.

18. The method of claim 16, wherein the supplemental gas flow provided by the gas recirculator exceeds the flow of gas coming from the ion source thorough the inlet capillary.

19. The method of claim 16, wherein the DC field and the gas flow from the gas recirculator cause the ions to be trapped in a plurality of ion traps according to their respective ion mobilities.

20. The method of claim 16, wherein the DC field acts on ions in a first direction and the gas flow is in a second direction, and the angle between the first direction and the second direction is a value between 10° and 80°.

* * * * *